United States Patent [19]

Moses

[11] Patent Number: 5,050,691

[45] Date of Patent: Sep. 24, 1991

[54] DETACHABLE TORQUE TRANSMITTING TOOL JOINT

[75] Inventor: John K. Moses, Houston, Tex.

[73] Assignee: Varco International, Inc., Orange, Calif.

[21] Appl. No.: 419,532

[22] Filed: Oct. 10, 1989

[51] Int. Cl.$^5$ ............................................. E21B 17/043
[52] U.S. Cl. ..................................... 175/57; 166/77.5; 175/320; 403/320; 285/18; 285/92; 285/94
[58] Field of Search ......................... 285/18, 81, 89, 92, 285/94; 166/77.5; 403/320; 175/57, 320

[56] References Cited

U.S. PATENT DOCUMENTS

| | | |
|---|---|---|
| 2,708,132 | 5/1955 | O'Neil . |
| 3,463,247 | 8/1969 | Klein . |
| 3,915,244 | 10/1975 | Brown . |
| 4,534,585 | 8/1985 | Saliger . |
| 4,658,915 | 4/1987 | Goris et al. ............................ 175/57 |
| 4,830,121 | 5/1989 | Krasnov et al. ................. 403/320 X |

FOREIGN PATENT DOCUMENTS

| | | |
|---|---|---|
| 1157568 | 11/1963 | Fed. Rep. of Germany . |
| 563155 | 8/1944 | United Kingdom . |

*Primary Examiner*—Dave W. Arola
*Attorney, Agent, or Firm*—William P. Green

[57] ABSTRACT

A device for transmitting torque from a power unit to a drill string or other rotary pipe, and which is constructed upon reverse rotation to preferentially break a threaded connection between the device and a stand of the pipe without disconnecting a plurality of lengths of pipe in the stand from one another. The torque transmitting device includes a tubular structure having a thread adapted to be advanced into engagement with a thread at an end of the pipe, and a shoulder ring carried by and rotatable with the tubular structure and having a shoulder engageable against a shoulder of the pipe to limit advancement of the threads together, with axial forces being transmitted from the tubular structure to the ring by interengageable bearing surfaces which permit limited rotary movement of the structure and its thread relative to the shoulder ring. The bearing surfaces are constructed to retain the ring in a predetermined fixed axial position relative to the tubular member, preventing axial movement of the ring relative to the structure as the structure turns about its axis relative to the ring. A C-spring disposed about the tubular structure acts to yieldingly urge the ring rotatively relative to the structure in a joint breaking direction. Two elements connected to flanges formed on the tubular structure and ring respectively are received between opposite ends of the C-spring and act to apply the force of the spring to the ring to urge it rotatively relative to the structure in the joint breaking direction. Pins received radially between the tubular structure and the ring limit their relative rotation to an angle constituting a small portion of a turn.

40 Claims, 3 Drawing Sheets

DETACHABLE TORQUE TRANSMITTING TOOL JOINT

This invention relates to connectors for transmitting torque from a rotary drive unit to a drill string or other string of pipe.

BACKGROUND OF THE INVENTION

In well drilling apparatus of the types referred to as 'top drive' and 'side drive' equipment, the drill string is driven by a powered rotary stem which is connected to the upper end of the string and advances downwardly with the string as the drilling operation progresses. When it becomes necessary for any reason to remove the string from the well, the string is broken down into a series of stands of pipe each usually consisting of three individual lengths of pipe which remain threadedly connected together and are handled and stored in the rig as a unit.

U.S. Pat. No. 4,658,915 issued Apr. 21, 1987 to G. A. Goris et al on "Easy Break-Out Tool Joint And Method" shows a device which is connectable between the powered stem of a top drive or side drive mechanism and the upper end of a drill string, and which is intended, upon reverse rotation of the stem, to break the threaded connection to the string without at the same time unscrewing the individual lengths of pipe from one another. To attain this purpose, the connector of that prior patent includes a tubular body which is threadedly connectable to the upper end of the drill string and which carries a separately formed ring having a shoulder adapted to bear against an upper shoulder of the string to limit advancement of the threads together and transmit torque to the string. Cam surfaces are provided between the tubular body of the device and the shoulder ring to retract the ring axially relative to the body upon rotation of the body through a limited angle relative to the ring in a joint breaking direction. This retraction is intended to relieve the tight engagement between the shoulders and enable the device to be disconnected from the upper end of the string with a break-out torque less than its make-up torque. In utilizing this device, there has been provided between the cam surfaces a lubricant having less friction than the lubricant normally employed between successive lengths of pipe in a particular stand, to encourage initiation of the camming action.

A problem encountered with this prior device resides in its tendency, under some operating conditions, to break the threaded joint between the connector and the string unintentionally and unpredictably during normal handling of the equipment. The break-out torque required to disconnect the drive unit from the string is not accurately predeterminable, and may be so light that the joint can break and release the string at times when detachment is not desired. Further, the camming action has the effect under some circumstances of causing only a partial loosening of the joint, without complete disconnection, and this partial loosening may upon subsequent rotation in a make-up direction cause the joint to tighten to a greatly excessive torque. The tendency for only partial loosening results from an undesirable variation in the resistance offered to unscrewing rotation of the device. As the connector is turned in a joint breaking direction, the resistance first decreases as the cam surfaces move relative to one another, and then at the end of the camming action the resistance to further unscrewing rotation increases and tends to retain the parts against complete separation.

SUMMARY OF THE INVENTION

A major object of the present invention is to provide a connector of the general type disclosed in U.S. Pat. No. 4,658,915, but which is more reliable and predictable in operation than the joint of that prior patent. The break-out torque of a device embodying the invention can be predetermined to a value assuring disconnection from the string at a torque well below the make-up torque, but at the same time keeping the torque required for breakout sufficiently high to avoid unwanted disconnection during normal drilling operations. In addition, the joint is designed to avoid partial loosening and subsequent excessive retightening in the manner discussed above.

A further object of the invention is to provide a connector of the described type which is constructed to allow reception of its various component parts within a reduced radial dimension enabling the exterior of the device to be of minimum size so that the connector can be stripped through a blowout preventer and the casing below a blowout preventer along with the remainder of the drill pipe.

Structurally, the connector of the invention includes a threaded tubular body and shoulder ring similar in some respects to the body and ring of U.S. Pat. No. 4,658,915, but with the ring of the invention being positively restrained against axial displacement relative to the body. The body is free for limited rotary movement relative to the ring, and during such rotary movement in an unscrewing direction moves slightly axially relative to the upper end of the drill string as a result of the threaded connection between the parts, while the shoulder ring remains in abutting engagement with the string and is frictionally retained thereby against rotary movement with the body. The amount of relative rotation permitted between the body and ring is limited at a value just sufficient to reduce the break-out torque a predetermined amount, but not excessively, so that the joint still provides substantial break-out torque of an accurately predeterminable value. The break-out torque is reduced enough to assure disconnection of the device from the drill string without unscrewing the joints between individual lengths of pipe in a stand, and yet the break-out torque remains substantial enough to avoid unintentional detachment of the drive mechanism from the string. Preferably, a lubricant is utilized between the bearing surfaces which has less friction than the lubricant employed in the threaded joints of the string.

BRIEF DESCRIPTION OF THE DRAWINGS

The above and other features and objects of the invention will be better understood from the following detailed description of the typical embodiment illustrated in the accompanying drawings, in which.

DESCRIPTION OF THE PREFERRED EMBODIMENT

Figure 1:
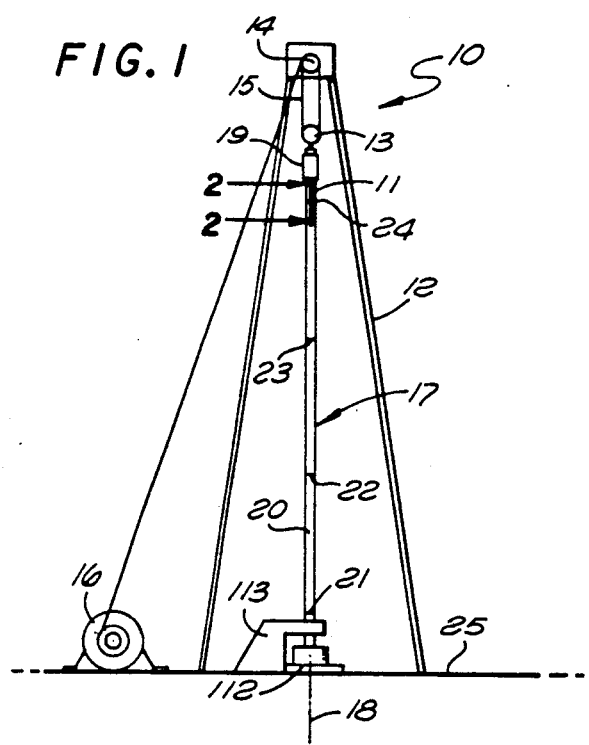
FIG. 1 is a diagrammatic representation of a top drive well drilling rig utilizing an easy break-out connector constructed in accordance with the invention.

FIG. 1 illustrates schematically certain of the components of a drill rig 10 within which a torque transmitting connector 11 embodying the invention may be utilized. The rig includes a derrick 12 having a traveling block 13 suspended from a crown block 14 by a line 15 which is actuable by the usual draw works 16 to raise and lower the traveling block and the drill string 17 suspended thereby. In the apparatus of FIG. 1, the drill string 17 is rotated about its vertical axis 18 by a 'top drive' power unit 19 which includes a motor operable to turn the string in either of two opposite directions. The string is formed of a series of pipe lengths 20 having internally threaded upper box ends and externally threaded lower pin ends, with these ends of the different lengths of pipe being connected together at threaded joints such as those identified by the numbers 21, 22, 23 and 24 in FIG. 1. The top drive power unit 19 is attached to the upper end of the string by connector 11 of the present invention. Traveling block 13 suspends drive unit 19, which in turn suspends and drives connector 11 and the drill string 17.

For the purposes of the present invention, the unit illustrated at 19 in FIG. 1 may alternatively represent a drive mechanism of the type known as a "side drive" power assembly, rather than a top drive unit. In such a side drive arrangement, the unit 19 still drives the drill string from its upper end, and moves upwardly and downwardly with the string, but does not itself include a motor. Instead, the motor may be located at the rig floor 25, and be appropriately connected to unit 19 by a kelly or other drive connection.

Each time that it becomes necessary to add pipe to the string during drilling, connector 11 is detached from the upper end of the string by reverse rotation, and there is inserted into the string an additional stand of pipe consisting of three of the individual pipe lengths 20. For example, such a three section stand or "triple" is represented between the joints 21 and 24 of FIG. 1. Similarly, when the string is for any reason removed from the well, it is separated into such three section stands which may be temporarily stored in the rig until they are subsequently reinserted into the string. The connector device 11 is especially designed to facilitate breaking of the threaded connection between unit 11 and the upper end of the string by reverse rotation of the motor of top drive assembly 19 without at the same time unscrewing any of the threaded joints 21, 22, 23 or 24 beneath the upper end of the string.

Figure 2:
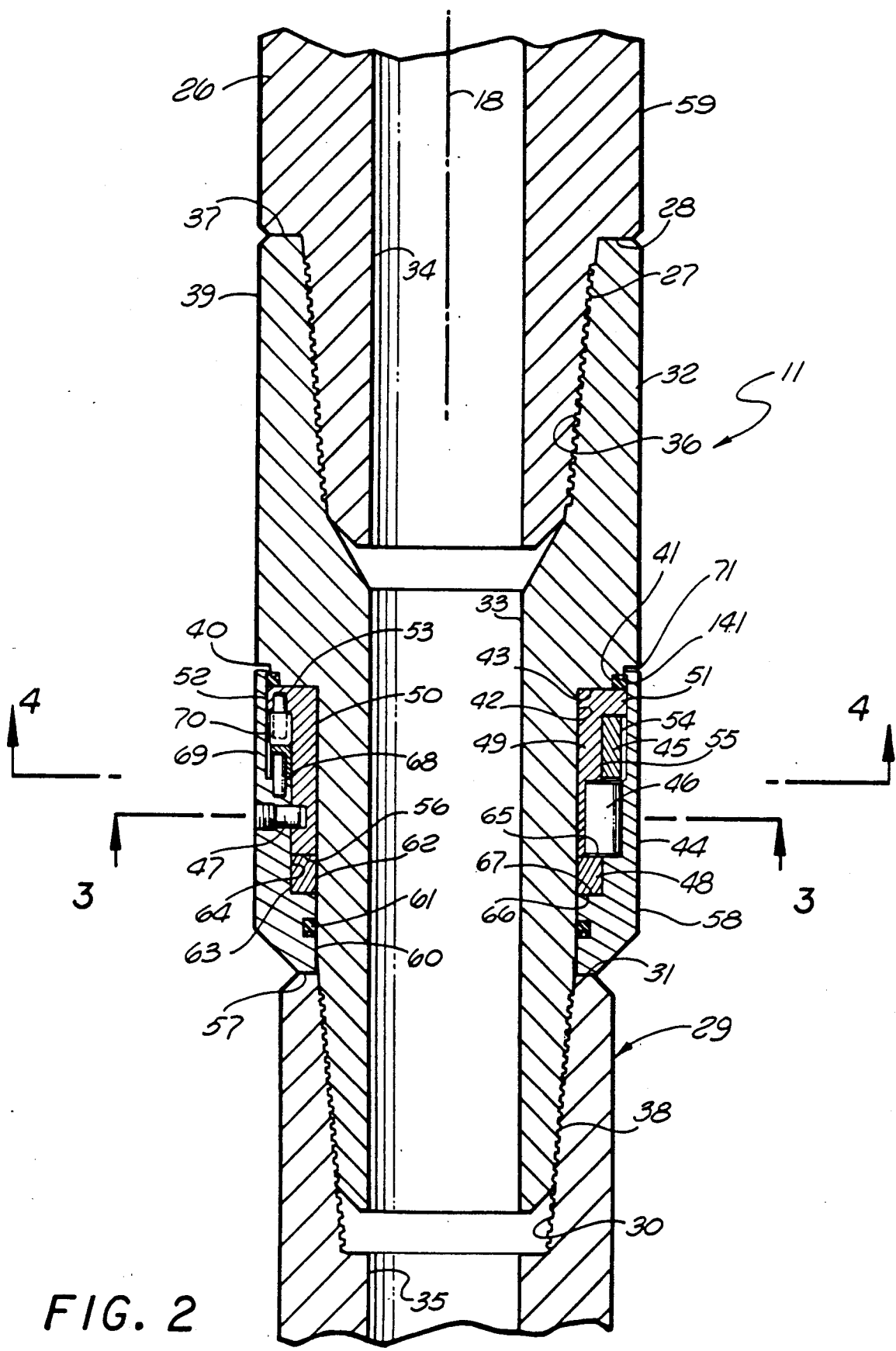
FIG. 2 is an enlarged vertical section through the connector of FIG. 1 taken on line 2—2 of FIG. 1.

Referring now to FIG. 2, there is represented at 26 in that figure the lower end of a tubular member which is driven rotatively about vertical axis 18 by the motor of top drive assembly 19. The pipe 26 of FIG. 2 may be a power driven vertical stem of the top drive unit 19, or may be a short sub connected threadedly to such a stem and driven thereby. At its lower end, member 26 has a conventional tapered external thread 27 and an annular downwardly facing shoulder 28 perpendicular to axis 18 and forming with thread 27 a lower pin end of element 26 connectable threadedly to unit 11. The upper box end of the top length of pipe of the drill string is represented at 29, and contains a conventional internal tapered thread 30, with an annular shoulder 31 formed at the upper end of the pipe and disposed transversely of axis 18.

The connector device 11 embodying the invention includes a main tubular body 32, centered about the vertical axis 18, and containing a cylindrical passage 33 communicating with passages 34 and 35 in element 26 and the drill string to conduct drilling fluid downwardly through the interior of all of these parts and the string to a bit carried at the lower end of the string. Body 32 has a tapered internal right hand thread 36 at its upper end centered about axis 18 and connectable to external thread 27 of element 26, and has an upwardly facing annular shoulder surface 37 disposed transversely of axis 18 and engageable against shoulder surface 28 of element 26 to limit the extent to which these parts may be connected together by right hand rotation, and to transmit torque between the parts.

At its lower end, body 32 of the connector device 11 has a downwardly tapered external right hand thread 38 centered about axis 18 and connectable to internal thread 30 at the upper end of the string. Extending downwardly from its upper end, body 32 has an external cylindrical surface 39 continuing downwardly to the location 40, at which body 32 is shaped to form a groove 41 extending annularly about axis 18 and adapted to receive an annular seal ring 141. Beneath the level of groove 41, body 32 has an external cylindrical surface 42 centered about axis 18, with an annular surface 43 at the upper end of surface 42 and disposed transversely of axis 18.

A shoulder ring 44 is disposed about cylindrical surface 42 of body 32, and is free for limited rotary movement relative to body 32 about axis 18. Ring 44 is yieldingly urged in a left hand or unscrewing rotary direction relative to body 32 about axis 18. Ring 44 is yieldingly urged by a C spring 45 in a left hand or unscrewing rotary direction relative to body 32 as viewed looking downwardly from the location of shoulder surface 37. Rotary motion between ring 44 and body 32 is limited by a number of axially extending stop pins 46. Three additional retaining pins 47 hold the shoulder ring 44 on body 32. Axial forces are transmitted to ring 44 through a thrust ring 48, and all of the movable parts 44, 45, 46, 47 and 48 may act against the body 32 or other parts through an annular reaction ring 49 which is attached rigidly to body 32 and forms in effect a replaceable or repairable portion thereof.

Member 49 has an inner cylindrical surface 50 which is a tight friction fit on the external surface 42 of body 32 and is thus fixed rigidly thereto. Preferably this frictional connection is formed by heating member 49 and then shrinking it onto surface 42. At its upper end, member 49 has an annular flange 51 projecting radially outwardly with respect to axis 18 and centered thereabout and defined by an outer cylindrical surface 52 and two transverse surfaces 53 and 54 at opposite sides of the flange. Surface 53 is engageable against surface 43 of the body. In extending downwardly beneath its upper flange 51, member 49 has an external cylindrical surface 55 centered about axis 18 and terminating downwardly at an annular bottom edge surface 56 of member 49.

Shoulder ring 44 has at its lower end a shoulder surface 57 which is annular and planar and disposed transversely of axis 18 and adapted to engage downwardly against surface 31 at the upper end of the string to limit advancement of thread 38 into the upper box end of the string. Externally, ring 44 has an outer surface 58 which is cylindrical about axis 18 and corresponds in diameter to external surface 39 of the upper end of body 32. These surfaces 58 and 39 may be of the same diameter as surface 59 of member 26, and are small enough in diameter to be strippable vertically through a blowout preventer and the casing below a blowout preventer if it becomes necessary or desirable.

Internally, shoulder ring 44 has near its lower end an inner cylindrical surface 60 which is a close fit about external surface 42 of body 32 to locate ring 44 for rotary movement about axis 18 relative to body 32. A second seal ring 61 is received within an internal groove in ring 44 for annular engagement with surface 42 to coact with upper ring 141 in preventing access of any fluids to the interior working parts of the device.

Thrust ring 48 is annular about axis 18 and of uniform rectangular cross section along its entire circular extent. That cross section is defined by an internal cylindrical surface 62 engaging external surface 42 of body 32, an external cylindrical surface 63 engaging an internal cylindrical surface 64 in ring 44, an annular upper surface 65 disposed transversely of axis 18 and engaging lower annular transverse surface 56 of member 49, and an annular bottom surface 66 of ring 48 disposed transversely of axis 18 and engaging a correspondingly transverse annular surface 67 formed in ring 44. Ring 48 preferably has a radial extent corresponding to the radial extent of the main vertically extending portion of member 49, as shown in FIG. 2. Thus, force is transmitted axially from body 32 through member 49 to thrust ring 48, and is transmitted by that thrust ring to shoulder ring 44 for ultimate application of the axial force to shoulder 31 at the upper end of the drill string through shoulder 57 of ring 44. Ring 44 is rotatable relative to ring 48 at the engaging surfaces 66 and 67, and surfaces 63 and 64, and the ring 48 may also be rotatable relative to body 32 and member 49 at surfaces 56 and 65, and surfaces 42 and 62. In order to enhance and induce early rotary movement of body 32 relative to ring 44 during a joint breaking operation, a lubricant having a low coefficient of friction with respect to the steel of which parts 44, 48, 49 and 32 are formed is provided between the engaging surfaces of the parts, and particularly on all of the external surfaces of ring 48. This lubricant when used between two steel surfaces desirably has a coefficient of friction which is not greater than about 0.06, and for best results is about 0.04. It is currently preferred that the lubricant utilized for this purpose be molybdenum disulfide, such as the product sold by Dow Corning Corporation as "Molykote Z Powder", which has a molybdenum disulfide particle size between 4 and 10 microns and has a coefficient of friction of 0.04. A lubricant is also normally provided at each of the threaded joints 21, 22, and 23, and the other joints in the drill string, in accordance with conventional practice, but that lubricant should have a coefficient of friction with steel surfaces which is higher than that of the lubricant provided between elements 44, 48, 49 and 32, and is usually at least about 0.08. The lubricant at the joints 21, 22, etc. may be any of the various tool joint thread compounds currently on the market, usually consisting of a stearate based grease or other grease containing finely divided metal particles of zinc, lead and/or copper.

Figure 9:
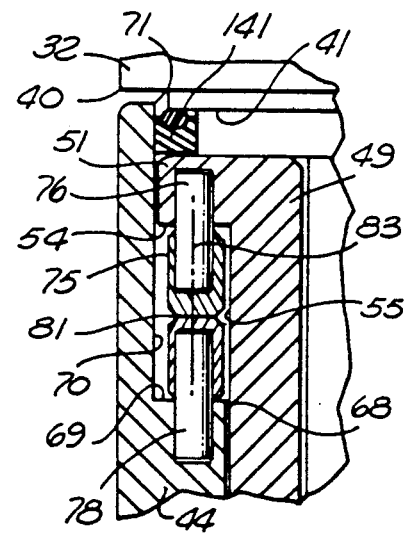
FIG. 9 is an enlarged fragmentary vertical section taken on line 9—9 of FIG. 8.

The internal cylindrical surface 64 in ring 44 may continue upwardly above the level of thrust ring 48 to a location 68, at which there is formed an upwardly facing transverse surface 69 extending radially outwardly to the location of an increased diameter internal surface 70 of ring 44 which continues upwardly to the upper edge 71 of that ring. C-spring 45 is essentially annular about axis 18 and located radially inwardly of inner surface 70 of ring 44, and radially between that surface and the external surface 55 of member 49. Spring 45 has the rectangular vertical cross sectional configuration illustrated in the right hand portion of FIG. 2 continuously along its entire circular extent except at the location of an interruption or gap 72 formed between opposite vertically extending end edges 73 and 74 of the spring (see FIG. 8). The spring is prestressed to normally tend by its resilience to constrict to a diameter less than that illustrated in FIG. 2, and is yieldingly expansible to a slightly increased diameter against its natural tendency to contract. To permit such slight expansion of the spring, the external diameter of the outer surface of the spring is slightly less than the internal diameter of surface 70 of ring 44. The spring force is transmitted from the C-spring to member 49 and the connected body 32 by a block 75 (FIGS. 8 & 9) connected to flange 51 of member 49 by a pin 76. Similarly, force is transmitted from the C-spring to shoulder ring 44 through a block 77 connected by a pin 78 to the radially inwardly projecting flange portion of ring 44 at the underside of block 77. Blocks 75 and 77 may be of identical essentially rectangular outline configuration as viewed in FIG. 8 looking radially inwardly toward axis 18, with block 75 being received above and engaging block 77, and with each of these blocks having its vertical opposite end edges 79 and 179 engaging the two end surfaces 73 and 74 respectively of the C-spring. The upper edge surface 80 of block 75 is disposed transversely of axis 18 and is received closely adjacent and preferably in engagement with the undersurface 54 of flange 51. The bottom surface of block 75 and the upper surface of block 77 extend transversely of axis 18 and engage one another slidably at 81. The undersurface 82 of the lower block 77 is disposed transversely of axis 18 and is closely adjacent and preferably in engagement with transverse flange surface 69 of ring 44. The two connector pins 76 and 78 are preferably cylindrical and centered about a common vertical axis 83 in the FIGS. 8 & 9 positions of the parts, with the opposite ends of pin 76 being received and confined within correspondingly cylindrical recesses or bores in parts 49 and 75 respectively, and with the opposite ends of pin 78 being similarly received within cylindrical bores in parts 44 and 77 respectively.

Figure 8:
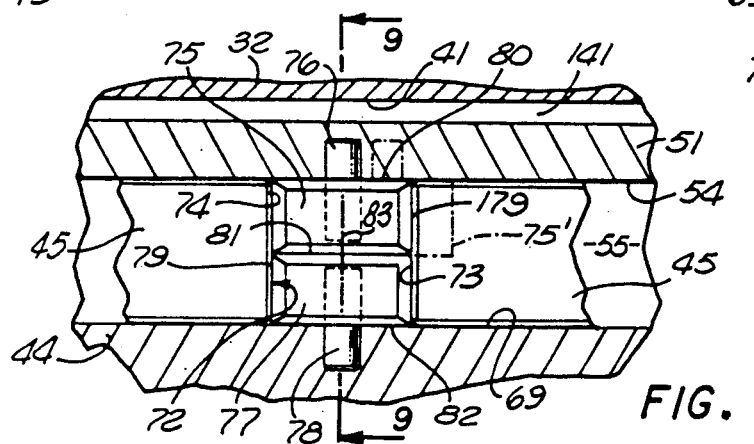
FIG. 8 is an enlarged fragmentary view taken on line 8—8 of FIG. 4.

If body 32 is turned in a left hand joint breaking or unscrewing direction relative to pipe section 29, while ring 44 is retained against rotation with body 32, the rotation of body 32 relative to ring 44 acts to move block 75 rightwardly as viewed in FIG. 8 relative to block 77, as to the broken line position 75', with the result that the blocks act against opposite ends of C-spring 45 and increase the width of gap 72 in the spring, and thus expand the spring against the resistance offered by its resilience. The spring then tends to yieldingly urge the blocks back to their full line position of FIG. 8 in which gap 72 between the ends of the spring is at a minimum. In this way, spring 45 normally returns ring 44 rotatively in a left hand direction (counterclockwise looking downwardly) relative to body 32 when ring 44 is not restrained against such movement by contact with the upper section 29 of the string.

The rotary movement of ring 44 relative to body 32 is limited by stop pins 46 to a very limited angle a constituting a small portion of a turn about axis 18, this angle desirably being between about 5 and 10 degrees. Preferably the device includes three of the stop pins 46 which may be identical and spaced evenly apart about axis 18. Each of these pins is preferably cylindrical about an individual axis 84 which is parallel to the central axis 18 of the device. Each pin is received partially within an axially extending recess 85 formed in ring 49, and partially within a second axially extending recess 86 formed in ring 44. Recesses 85 are approximately semi-cylindrical and of a diameter corresponding to the external cylindrical surfaces of pins 46, to positively locate the pins 46 relative to ring 49. The recesses 86 which receive the outer halves of pins 46 have a circular extent about axis 18 great enough to allow limited movement of pins 46 within recesses 86. At opposite ends of that range of movement, pins 46 engage cylindrically curved surfaces 87 in ring 44 to positively limit the rotary movement of ring 44 relative to body 32. Spring 45 urges ring 44 rotatively to the FIG. 3 position relative to body 32.

The pins 47 for retaining ring 44 on body 32 may be short cylindrical pins centered about three individual evenly circularly spaced axes 88 extending perpendicular to and intersecting axis 18, and are located relative to ring 44 by reception within cylindrical passages 89 in ring 44. The inner ends of pins 47 project into arcuately extending grooves 90 formed in the outer surface of ring 49, to interlock ring 44 with ring 49 and body 32 and prevent relative axial separation of ring 44 from parts 32 and 49, while allowing limited rotary movement of ring 44 relative to body 32 and ring 49. Plugs 91 are connected threadedly into passages 89 outwardly beyond pins 47, to retain the pins in their assembled positions.

Figure 5:
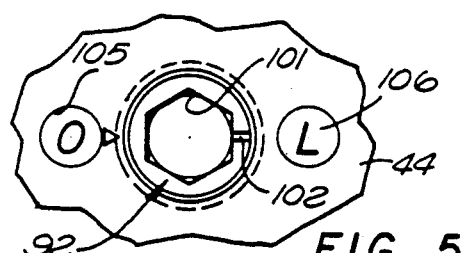
FIG. 5 is a fragmentary side elevational view taken on line 5—5 of FIG. 3.

Under some operating conditions, it is desirable to rigidly lock ring 44 in fixed position relative to body 32 and ring 49, so that the entire assembly functions as an essentially conventional connector sub without the easy break feature of the present invention. For this purpose, the device includes a lock element 92, which is mounted within an opening 93 in the side wall of ring 44 for rotary movement about an axis 94 extending perpendicular to and intersecting central axis 18 of the device. Passage 93 has a cylindrical portion 95 within which a cylindrical portion 96 of lock element 92 is received. A reduced diameter cylindrical portion 97 of element 92 is received within a reduced diameter portion 98 of passage 93, with annular tapering surfaces 99 of element 92 and ring 44 being engageable to retain element 92 within opening 93. A seal ring 100 carried within an annular groove in element 92 is engageable with surface 98 to prevent movement of any fluid or material between the interior and exterior of the device and past element 92. A hexagonal socket recess 101 formed in element 92 is accessible from the exterior of the device to allow rotation of lock element 92 through 180° between locked and released positions. A marking 102 at the outer end of element 92 (FIG. 5) coacts with two markings 105 and 106 formed on the outer surface of ring 44, to indicate when the lock element is in its released and locked positions respectively. The locked condition of element 92 may be indicated by the letter L, and the released position may be indicated by the letter O.

Figure 6:
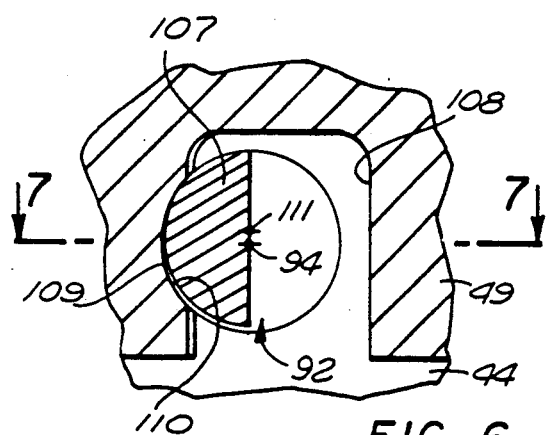
FIG. 6 is a fragmentary vertical section taken on line 6—6 of FIG. 3.
Figure 7:
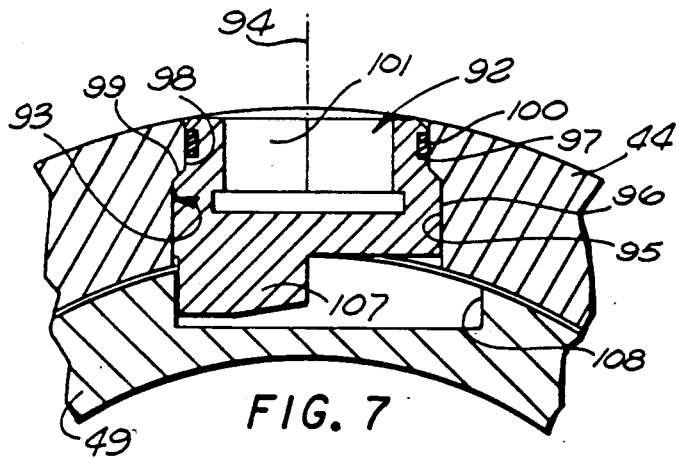
FIG. 7 is an enlarged fragmentary horizontal section taken on line 7—7 of FIG. 6.

At its axially inner end, lock element 92 has a projection 107 (FIGS. 6 and 7), which extends into a recess 108 formed in the outer surface of ring 49, and which is essentially semi-circular about the rotary axis 94 of element 92. The peripheral semi-cylindrical surface 109 of projection 107 is engageable against a similarly shaped partial cylindrical side wall surface 110 of recess 108 in the FIGS. 6 and 7 locked position of the parts, to positively prevent rotary movement of ring 44 from the position of FIG. 3 relative to body 32. When element 92 is turned about axis 94 through 180° from the position of FIGS. 6 and 7, projection 107 of element 92 is moved away from surface 110 and faces rightwardly as viewed in FIGS. 6 and 7 rather than leftwardly, and then has sufficient clearance with respect to the sides of recess 108 to allow free rotary movement of ring 44 relative to body 32 through the previously discussed range of movement permitted by stop pins 46. Preferably, the semi-cylindrical locking surface 109 of projection 107 of element 92 has a camming engagement with surface 110 of ring 44 so that surface 109 wedges tightly against surface 110 as element 92 reaches its FIG. 6 locking position. For this purpose, surface 109 on projection 107 may be slightly eccentric with respect to the rotary axis 94 of element 92. In FIG. 6, the axis 111 about which semi-cylindrical surface 109 of projection 107 is formed is parallel to axis 94 but offset slightly upwardly with respect to axis 94 so that as element 92 is turned in a counterclockwise direction as viewed in that Figure, surface 109 gradually wedges against surface 110 to form a rigid connection between the parts 44 and 49.

To now describe briefly the manner of use of the connector 11 during the drilling of a well, the connector 11 functions during normal drilling to transmit rotary motion from top drive unit 19 to the drill string and its carried bit. When connector 11 has advanced downwardly to a position just above the rig floor 25, the upper end of the uppermost length of pipe in the string is supported and retained against rotation by appropriate equipment at the rig floor, such as a spider or slip assembly 112 for supporting the string, and a tong or torque wrench assembly 113 for holding the string against rotation, after which top drive unit 19 is energized reversely to break the connection between connector device 11 and the string. An additional three length stand of pipe can then be moved into position, and connected threadedly to connector 11 and to the string by powered right hand rotation of the stem of unit 19.

When it is desired to remove a stand of pipe from the string, the string is elevated to the position of FIG. 1 in which the joint 21 at the lower end of the stand is slightly above the rig floor. The length of pipe just beneath joint 21 is then supported by spider 112 and retained against rotation by the tong or torque wrench assembly 113. The operator then energizes the motor of top drive assembly 19 to turn stem 26 and connector unit 11 in a left hand, counterclockwise joint breaking direction. When thus energized, device 11 performs its function of breaking the threaded connection between the lower end of body 32 and the upper end of the uppermost length of pipe of the drill string without attaining sufficient torque to break the connections at 21, 22 or 23.

During the initial portion of the left hand rotation of body 32 of device 11, ring 44 is retained frictionally against rotation with body 32 by virtue of the tight engagement of shoulder 57 at the lower end of ring 44 with shoulder 31 at the upper end of the upper length of pipe in the string. The very low friction characteristics of the lubricant between thrust ring 48 and parts 44, 49 and 32 assures relative rotation between body 32 and ring 44 without disconnection of joints 21, 22 or 23. As body 32 turns in its joint breaking direction, that body advances slightly upwardly by virtue of the threaded engagement between body 32 and the upper length of pipe in the string. When body 32 reaches the end of its permitted range of rotary movement relative to ring 44, as determined by stop pins 46, these pins then act to turn ring 44 with body 32 to completely break the joint. By that time, however, the slight upward movement of body 32 has been sufficient to relieve the axial force between shoulder surfaces 31 and 57 enough to enable ring 44 to be turned without disconnection of any of the other joints. The range of movement permitted by pins 46 is predetermined to attain a breakout torque for disconnecting threads 30 and 38 which is substantially less than the make-up torque to which those threads are tightened when the device 11 is connected to the string, but is nevertheless still great enough to assure against accidental disconnection of the device 11 from the string. Preferably, the break-out torque between device 11 and the string is between about 50 and 75 percent of the make-up torque, for best results between about 60 and 65 percent, and optimally approximately 62 percent.

Figure 3:
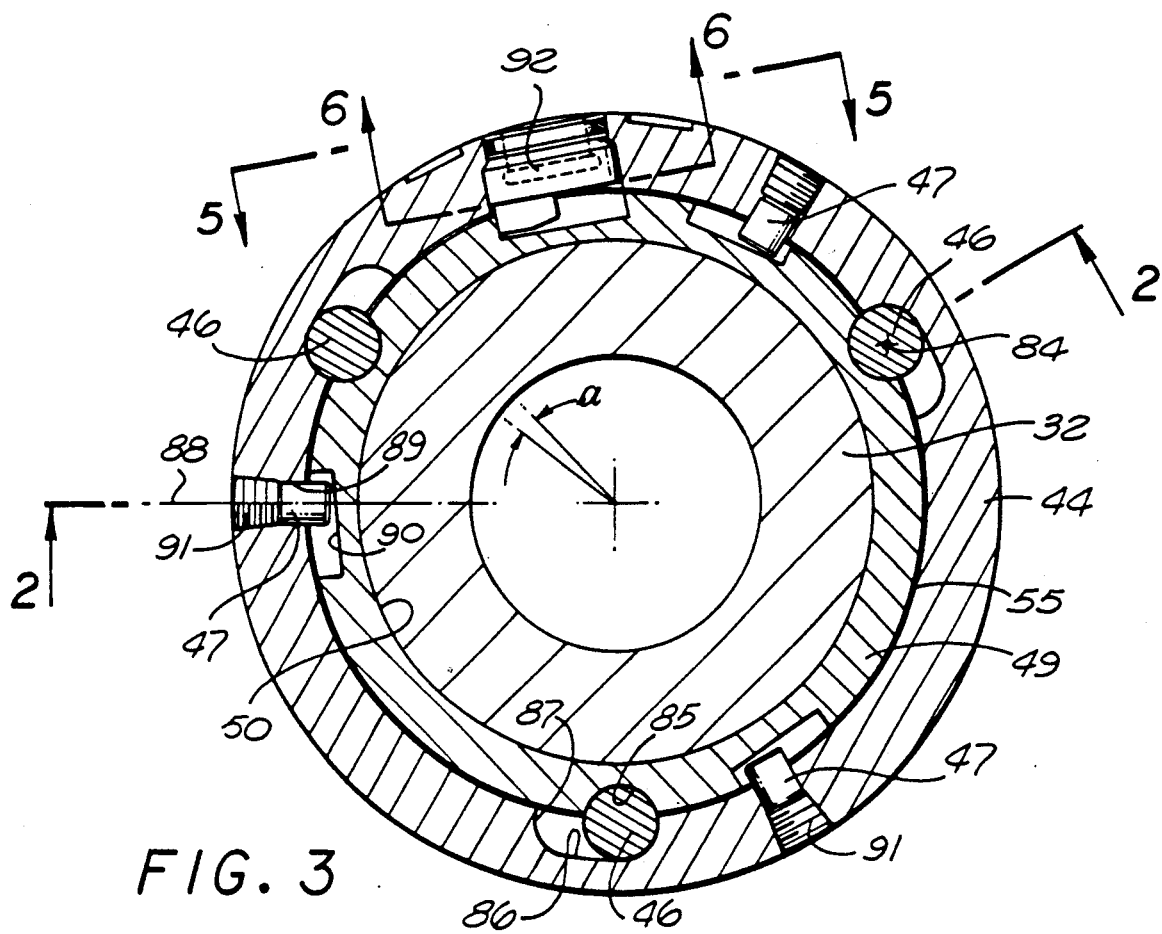
FIGS. 3 and 4 are enlarged horizontal sections taken on lines 3—3 and 4—4 respectively of FIG. 2.
Figure 4:
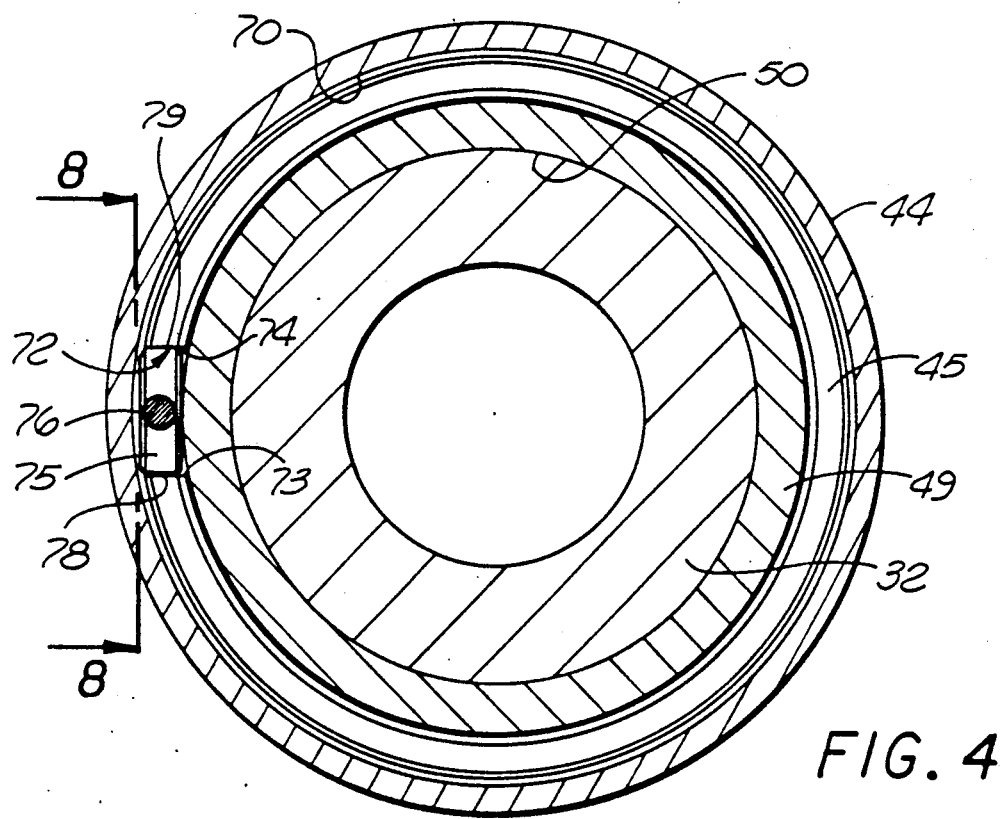

As soon as the ring 44 has moved out of engagement with the upper end of the drill string, spring 45 automatically returns ring 44 to its normal position represented in FIG. 3, relative to body 32, so that when the device 11 is next connected to the upper end of a length of pipe the make-up torque will be transmitted directly from body 32 to ring 44 through pins 46 without lost motion.

After the top drive unit 19 and connector 11 have been disconnected from the upper end of the drill string 17, the lower end of the top three section stand is disconnected from the rest of the string by the torque wrench 113 or other equipment on the rig floor, so that the stand may then be moved by an elevator or other equipment to a storage location in a side of the derrick or elsewhere. Unit 19 and connector 11 can then be lowered for attachment to the upper end of the remaining string, just above the rig floor, by powered rotation of the stem of unit 19 in a make-up direction. Unit 19 and the connected string are then elevated to the FIG. 1 position for removal of the next successive stand.

While a certain specific embodiment of the present invention has been disclosed as typical, the invention is of course not limited to this particular form, but rather is applicable broadly to all such variations as fall within the scope of the appended claims.

I claim:
1. A torque transmitting device comprising:
   a tubular structure having a thread adapted to be advanced into engagement with a thread of a rotary pipe by turning said structure relative to said pipe about an axis in a predetermined make-up direction, to form a joint for transmitting torque from said structure to said pipe;
   a ring carried by said tubular structure and rotatable therewith and having a shoulder engageable axially against a shoulder of said pipe to limit advancement of the threads together;
   interengaging bearing surfaces for transmitting force axially from said structure to said ring in a direction axially toward said pipe and permitting limited rotary movement of said structure and said thread thereof relative to the ring;
   said bearing surfaces being constructed to retain said ring in a predetermined fixed axial position relative to said tubular structure, preventing any axial movement of said ring relative to said structure, as the structure turns about said axis relative to the ring; and
   means limiting the rotary movement of said tubular structure relative to said ring in a joint breaking direction the opposite of said make-up direction to a predetermined angle constituting a small portion of a turn.

2. A torque transmitting device as recited in claim 1, in which said means limit rotary movement of said tubular structure relative to said ring to an angle between about 5 and 10 degrees.

3. A torque transmitting device as recited in claim 1, including an annular thrust ring centered about said axis and interposed axially between portions of said tubular structure and said first mentioned ring, said interengaging bearing surfaces including annular surfaces of said tubular structure and said thrust ring transmitting force axially from the tubular structure to said thrust ring, and including also annular bearing surfaces of said thrust ring and said first mentioned ring for transmitting force axially therebetween.

4. A torque transmitting device as recited in claim 1, in combination with a stand formed of a plurality of said pipes connected together by at least one threaded joint, with an end pipe of the stand being connected to said thread of said tubular structure; said interengaging bearing surfaces for transmitting force from said tubular structure to said ring having less friction than any threaded joint between said pipes of said stand.

5. A torque transmitting device as recited in claim 1, in combination with a stand formed of a plurality of said pipes connected together by at least one threaded joint, with an end pipe of the stand being connected to said thread of said tubular structure; a first lubricant at each threaded joint between said pipes of said stand; and a second lubricant between said interengaging bearing surfaces and having less friction than the first lubricant to cause relative movement of said bearing surfaces and resultant breaking of the joint at said thread of the tubular structure without disconnection of any joint between said pipes of said stand when the tubular structure is turned in said joint breaking direction.

6. A torque transmitting device as recited in claim 1, including lubricant reducing the friction between said interengaging bearing surfaces to a value assuring, that upon rotation of said tubular structure in said joint breaking direction, the connection between said threads of said tubular structure and said pipe will break without disconnection of a threaded joint in a stand of which said pipe is a part.

7. A torque transmitting device as recited in claim 6, in which said bearing surfaces are formed of steel, and said lubricant has a coefficient of friction between steel surfaces of not over about 0.06.

8. A torque transmitting device as recited in claim 6, in which said lubricant is molybdenum disulfide.

9. A torque transmitting device as recited in claim 1, in which said means limit the rotary movement of said tubular structure relative to said ring to an angle causing the break-out torque between said device and pipe to be between about 50 and 75 percent of the make-up torque between said device and said pipe.

10. A torque transmitting device as recited in claim 1, in which said means limit the rotary movement of said tubular structure relative to said ring to an angle causing the break-out torque between said device and said pipe to be between about 60 and 65 percent of the make-up torque between said device and said pipe.

11. A torque transmitting device comprising:
a tubular structure having a thread adapted to be advanced into engagement with a thread of a rotary pipe by turning said structure relative to said pipe about an axis in a predetermined make-up direction, to form a joint for transmitting torque from said structure to said pipe;
a ring carried about said structure and rotatable therewith and having a shoulder engageable against a shoulder of said pipe to limit advancement of the threads together;
means for transmitting force axially from said tubular structure to said ring in a direction axially toward said pipe and permitting limited rotary movement of said structure and said thread thereof relative to the ring;
a C-spring extending about said tubular structure at a location radially between said structure and said ring, and having opposite ends spaced apart to define a gap therebetween;
said tubular structure having a flange projecting radially outwardly to a location axially opposite said C-spring at one axial side thereof;
said ring having a flange projecting radially inwardly to a location axially opposite said C-spring at a second axial side thereof; and
two parts connected to said two flanges respectively and projecting axially toward one another axially between said two flanges and both received within said gap formed between opposite ends of the C-spring at locations engaging said ends of the spring, so that said parts can apply force in opposite rotary directions against said opposite ends of the spring in a relation urging said ring rotatively relative to said structure in a joint breaking direction the opposite of said make-up direction by the force of said spring.

12. A torque transmitting device as recited in claim 11, in which said two parts are two similar blocks received axially adjacent one another within said gap.

13. A torque transmitting device as recited in claim 11, including two pins received within recesses in said two flanges respectively and carrying said parts within said gap.

14. A torque transmitting device as recited in claim 11, in which said two parts are two similar generally rectangular blocks received axially adjacent one another within said gap and each having opposite end edges engaging said two ends respectively of said C-spring; there being two axially extending pins having first ends projecting into recesses in said two flanges respectively and having second ends projecting into recesses in said two blocks respectively to connect the blocks to the flanges.

15. A torque transmitting device comprising:
a tubular structure having a thread adapted to be advanced into engagement with a thread of a rotary pipe by turning said structure relative to said pipe about an axis in a predetermined make-up direction, to form a joint for transmitting torque from said structure to said pipe;
a ring carried about said structure and rotatable therewith and having a shoulder engageable against a shoulder of said pipe to limit advancement of the threads together;
means for transmitting force axially from said tubular structure to said ring in a direction axially toward said pipe and permitting limited rotary movement of said structure and said thread thereof relative to the ring;
a C-spring extending about said tubular structure at a location radially between said structure and said ring and acting in opposite rotary directions against said structure and said ring to yieldingly urge said ring rotatively relative to said structure in a joint breaking direction the opposite of said make-up direction; and
at least one stop pin which extends along a second axis essentially parallel to said first mentioned axis and is received radially between said tubular structure and said ring at a location axially offset from said spring, and which projects into radially opposed recesses in said structure and said ring in a relation limiting rotary movement of said structure relative to said ring.

16. A torque transmitting device as recited in claim 15, which said stop pin is essentially cylindrical about said second axis.

17. A torque transmitting device as recited in claim 15, in which said stop pin is essentially cylindrical about said second axis, one of said radially opposed recesses being partial cylindrical in configuration about said second axis and receiving and closely confining a portion of said stop pin, the other of said radially opposed recesses having a circular extent about said first axis great enough to allow limited movement of said pin within said other recess circularly about said first axis.

18. A torque transmitting device comprising:
a tubular structure having a tapered internal thread at one end and a tapered external thread at a second end adapted to be advanced into engagement with an internal thread of a rotary pipe by turning said structure relative to said pipe about an axis in a predetermined make-up direction, to form a joint for transmitting torque from said structure to said pipe;
a shoulder ring disposed about said tubular structure near said second end thereof and rotatable therewith and having an axially facing shoulder engageable against a shoulder of said pipe to limit advancement together of said external thread of said structure and said thread of said pipe;
an annular thrust ring received radially between said structure and said shoulder ring and engaging axially opposed surfaces of said structure and said shoulder ring to transmit force axially from said tubular structure to said shoulder ring in a direction axially toward said pipe, and permitting rotary movement of said structure relative to the shoulder ring;
said thrust ring and said surfaces of said tubular structure and said shoulder ring being annular and constructed to retain said shoulder ring in a predetermined fixed axial position relative to said tubular structure and said external thread thereof, preventing axial movement of said shoulder ring relative to said tubular structure, as the tubular structure turns about said axis relative to the shoulder ring;
a C-spring extending about said tubular structure at a location radially between said structure and said shoulder ring and offset axially from said thrust ring and acting in opposite rotary directions against said structure and said ring to yieldingly urge said shoulder ring rotatively relative to said tubular structure in a joint breaking direction the opposite of said make-up direction; and at least one axially extending stop pin received radially between said structure and said shoulder ring at a location offset axially from both said thrust ring and said C-spring and projecting into radially opposed axially extending recesses in both said tubular structure and said shoulder ring and acting to limit rotary movement of said structure relative to said shoulder ring in said joint breaking direction to a predetermined angle constituting a small portion of a turn.

19. A torque transmitting device as recited in claim 18, in which said tubular structure has a flange projecting radially outwardly to a location axially opposite said C-spring at one axial side thereof, said shoulder ring having a flange projecting radially inwardly to a location axially opposite said C-spring at a second axial side thereof, there being two spring engaging parts connected to said two flanges respectively and projecting axially toward one another between said two flanges and both received within a gap formed between opposite ends of said C-spring and engaging said ends in a relation urging said shoulder ring rotatively relative to said tubular structure in said joint breaking direction by the force of said spring.

20. A torque transmitting device as recited in claim 19, including two axially extending connector pins having first ends projecting into recesses in said flanges respectively and having second ends projecting into recesses in said two parts respectively.

21. A torque transmitting device as recited in claim 20, in which said stop pin is cylindrical about a second axis extending parallel to said first axis, one of said radially opposed recesses being of generally semi-cylindrical configuration about said second axis and of a diameter corresponding to that of said stop pin and closely receiving said stop pin to locate it; the other of said radially opposed recesses receiving a portion of said stop pin and having a circular extent great enough to permit limited movement of said stop pin within said other recess, and having cylindrically curved surfaces at spaced locations engageable with said stop pin to limit the rotary movement of said structure relative to said shoulder ring.

22. A torque transmitting device as recited in claim 21, including retaining elements carried within openings in said shoulder ring and each projecting inwardly into a recess formed in the exterior of said tubular structure and acting to retain the shoulder ring against movement axially off of said tubular structure.

23. A torque transmitting device as recited in claim 22, in which said stop pin limits the rotary movement of said tubular structure relative to said ring to an angle causing the break-out torque between said device and said pipe to be between about 60 and 65 percent of the make-up torque between said device and said pipe.

24. A torque transmitting device as recited in claim 18, in which said stop pin is cylindrical about a second axis extending parallel to said first axis, one of said radially opposed recesses being of generally semi-cylindrical configuration about said second axis and of a diameter corresponding to that of said stop pin and closely receiving said stop pin to locate it, the other of said radially opposed recesses receiving a portion of said stop pin and having a circular extent great enough to permit limited movement of said stop pin within said other recess, and having cylindrically curved surfaces at spaced locations engageable with said stop pin to limit the rotary movement of said structure relative to said shoulder ring.

25. A torque transmitting device as recited in claim 18, including retaining elements carried within openings in said shoulder ring and each projecting inwardly into a recess formed in the exterior of said tubular structure and acting to retain the shoulder ring against movement axially off of said tubular structure.

26. A torque transmitting device comprising:

a tubular structure having a thread adapted to be advanced into engagement with a thread of a rotary pipe by turning said structure relative to said pipe about an axis in a predetermined make-up direction, to form a joint for transmitting torque from said structure to said pipe;

a ring carried about said structure and rotatable therewith and having a shoulder engageable against a shoulder of said pipe to limit advancement of the threads together;

means for transmitting force axially from said tubular structure to said ring in a direction axially toward said pipe and permitting rotary movement of said structure and said thread thereof relative to the ring;

a C-spring extending about said tubular structure radially between said structure and said ring and acting in opposite rotary directions against said structure and said ring in a relation yieldingly urging said ring rotatively relative to said structure in a joint breaking direction the opposite of said make-up direction;

means for limiting the rotary movement of said ring relative to said structure; and a lock member carried movably by said ring and actuable from the exterior thereof and projecting into a recess in said tubular structure and engageable therewith to releasably lock said tubular structure against rotary movement relative to said ring in said joint breaking direction.

27. A torque transmitting device as recited in claim 26, in which said lock member is mounted for rotation relative to said ring about a second axis extending essentially transversely of said first axis, and has an essentially arcuate surface extending partially about said second axis and engageable with an essentially arcuate surface at a side of said recess in locking relation.

28. A torque transmitting device comprising:

a tubular structure having a thread adapted to be advanced into engagement with a thread of a rotary pipe by turning said structure relative to said pipe about an axis in a predetermined make-up direction, to form a joint for transmitting torque from said structure to said pipe;

a ring carried by said tubular structure and rotatable therewith and having a shoulder engageable axially against a shoulder of said pipe to limit advancement of the threads together;

interengaging bearing surfaces for transmitting force axially from said structure to said ring in a direction axially toward said pipe and permitting limited rotary movement of said structure and said thread thereof relative to the ring;

said bearing surfaces being constructed to retain said ring in a predetermined fixed axial position relative to said tubular structure, preventing any axial movement of said ring relative to said structure, as the structure turns about said axis relative to the ring;

means limiting the rotary movement of said tubular structure relative to said ring in a joint breaking direction the opposite of said make-up direction to a predetermined angle constituting a small portion of a turn; and a spring carried by said tubular structure and acting in opposite rotary directions against said structure and said ring in a relation yieldingly urging said ring rotatively relative to said structure in said joint breaking direction.

29. A torque transmitting device as recited in claim 28, in which said means limit rotary movement of said tubular structure relative to said ring to an angle between about 5 and 10 degrees.

30. A torque transmitting device as recited in claim 28, including an annular thrust ring centered about said axis and interposed axially between portions of said tubular structure and said first mentioned ring, said interengaging bearing surfaces including annular surfaces of said tubular structure and said thrust ring transmitting force axially from the tubular structure to said thrust ring, and including also annular bearing surfaces of said thrust ring and said first mentioned ring for transmitting force axially therebetween.

31. A torque transmitting device as recited in claim 28, in which said ring is disposed about said tubular structure, said means limiting rotary movement of said structure relative to said ring including at least one pin received radially between said tubular structure and said ring and projecting into radially opposed recesses in the structure and ring.

32. A torque transmitting device as recited in claim 28, in combination with a stand formed of a plurality of said pipes connected together by at least one threaded joint, with an end pipe of the stand being connected to said thread of said tubular structure; said interengaging bearing surfaces for transmitting force from said tubular structure to said ring having less friction than any threaded joint between said pipes of said stand.

33. A torque transmitting device as recited in claim 28, in combination with a stand formed of a plurality of said pipes connected together by at least one threaded joint, with an end pipe of the stand being connected to said thread of said tubular structure; a first lubricant at each threaded joint between said pipes of said stand; and a second lubricant between said interengaging bearing surfaces and having less friction than the first lubricant to cause relative movement of said bearing surfaces and resultant breaking of the joint at said thread of the tubular structure without disconnection of any joint between said pipes of said stand when the tubular structure is turned in said joint breaking direction.

34. A torque transmitting device as recited in claim 28, including lubricant reducing the friction between said interengaging bearing surfaces to a value assuring, that upon rotation of said tubular structure in said joint breaking direction, the connection between said threads of said tubular structure and said pipe will break without disconnection of a threaded joint in a stand of which said pipe is a part.

35. A torque transmitting device as recited in claim 34, in which said bearing surfaces are formed of steel, and said lubricant has a coefficient of friction between steel surfaces of not over about 0.06.

36. A torque transmitting device as recited in claim 34, in which said lubricant is molybdenum disulfide.

37. A torque transmitting device as recited in claim 28, in which said means limit the rotary movement of said tubular structure relative to said ring to an angle causing the break-out torque between said device and said pipe to be between about 50 and 75 percent of the make-up torque between said device and said pipe.

38. A torque transmitting device as recited in claim 28, in which said means limit the rotary movement of said tubular structure relative to said ring to an angle causing the break-out torque between said device and said pipe to be between about 60 and 65 percent of the make-up torque between said device and said pipe.

39. A torque transmitting device comprising:
a tubular structure having a thread adapted to be advanced into engagement with a thread of a rotary pipe by turning said structure relative to said pipe about an axis in a predetermined make-up direction, to form a joint for transmitting torque from said structure to said pipe;

a ring carried by said tubular structure and rotatable therewith and having a shoulder engageable axially against a shoulder of said pipe to limit advancement of the threads together;

interengaging bearing surfaces for transmitting force axially from said structure to said ring in a direction axially toward said pipe and permitting limited rotary movement of said structure and said thread thereof relative to the ring;

said bearing surfaces being constructed to retain said ring in a predetermined fixed axial position relative to said tubular structure, preventing any axial movement of said ring relative to said structure, as the structure turns about said axis relative to the ring;

means limiting the rotary movement of said tubular structure relative to said ring in a joint breaking direction the opposite of said make-up direction to a predetermined angle constituting a small portion of a turn; and a C-spring disposed about said tubular structure and radially between said tubular structure and said ring and acting in opposite rotary directions against said ring and said structure to yieldingly urge said ring rotatively relative to said structure in said joint breaking direction.

40. A torque transmitting device comprising:
a tubular structure having a thread adapted to be advanced into engagement with a thread of a rotary pipe by turning said structure relative to said pipe about an axis in a predetermined make-up direction, to from a joint for transmitting torque from said structure to said pipe;

a ring carried by said tubular structure and rotatable therewith and having a shoulder engageable axially against a shoulder of said pipe to limit advancement of the threads together;

interengaging bearing surfaces for transmitting force axially from said structure to said ring in a direction axially toward said pipe and permitting limited rotary movement of said structure and said thread thereof relative to the ring;

said bearing surfaces being constructed to retain said ring in a predetermined fixed axial position relative to said tubular structure, preventing any axial movement of said ring relative to said structure, as the structure turns about said axis relative to the ring; and means limiting the rotary movement of said tubular structure relative to said ring in a joint breaking direction the opposite of said make-up direction to a predetermined angle constituting a small portion of a turn;

said ring being disposed about said tubular structure;

said means limiting rotary movement of said structure relative to said ring including at least one pin received radially between said tubular structure and said ring and projecting into radially opposed recesses in the structure and ring.

* * * * *